(12) United States Patent
Harbindu et al.

(10) Patent No.: US 10,858,585 B2
(45) Date of Patent: Dec. 8, 2020

(54) BENZOTRIAZOLE DERIVATIVES AS CORROSION INHIBITORS

(71) Applicant: ECOLAB USA INC., St. Paul, MN (US)

(72) Inventors: Anand Harbindu, Pune (IN); Jothibasu Seetharaman, Pune (IN)

(73) Assignee: ECOLAB USA INC., St. Paul, MN (US)

( * ) Notice: Subject to any disclaimer, the term of this patent is extended or adjusted under 35 U.S.C. 154(b) by 179 days.

(21) Appl. No.: 16/235,299

(22) Filed: Dec. 28, 2018

(65) Prior Publication Data

US 2019/0203118 A1   Jul. 4, 2019

Related U.S. Application Data

(60) Provisional application No. 62/613,295, filed on Jan. 3, 2018.

(51) Int. Cl.
| | |
|---|---|
| *C09K 15/30* | (2006.01) |
| *C23F 11/14* | (2006.01) |
| *C09K 15/02* | (2006.01) |
| *C23F 11/10* | (2006.01) |
| *C23F 11/08* | (2006.01) |
| *C02F 5/12* | (2006.01) |

(52) U.S. Cl.
CPC ............... *C09K 15/30* (2013.01); *C02F 5/12* (2013.01); *C02F 5/125* (2013.01); *C09K 15/02* (2013.01); *C23F 11/08* (2013.01); *C23F 11/10* (2013.01); *C23F 11/149* (2013.01); *C02F 2303/08* (2013.01)

(58) Field of Classification Search
CPC ......... C09K 15/30; C09K 15/02; C23F 11/10; C23F 11/08; C23F 11/149; C02F 5/125; C02F 5/12; C02F 2303/08
See application file for complete search history.

(56) References Cited

U.S. PATENT DOCUMENTS 2,462,405 A * 2/1949 Keller .................... C09B 56/04
  534/587
2,817,665 A   12/1957 Zweidler et al.
(Continued)

FOREIGN PATENT DOCUMENTS

AU   2015227487 B1   12/2015
BE     868846 A       1/1979
(Continued)

OTHER PUBLICATIONS

Agafonkina, M. O. et al., "Substituted Benzotriazoles as Inhibitors of Copper Corrosion in Borate Buffer Solutions" Russian Journal of Physical Chemistry A (2017) 91(8) 1414-1421.
(Continued)

*Primary Examiner* — Pamela H Weiss
(74) *Attorney, Agent, or Firm* — Eric D. Babych; Barnes & Thornburg LLP

(57) ABSTRACT

The present disclosure relates to corrosion inhibitor compositions, formulations, and compounds. The compositions, formulations, and compounds may be used in various methods to inhibit corrosion of metallic surfaces in aqueous environments. In some embodiments, the metallic surface may include one or more of copper, iron, brass, nickel, aluminium, manganese, lead, and bronze.

20 Claims, 1 Drawing Sheet

(56) References Cited

U.S. PATENT DOCUMENTS

| | | | |
|---|---|---|---|
| 2,837,528 A | 6/1958 | Pugin et al. | |
| 2,972,611 A | 2/1961 | Zweidler et al. | |
| 3,049,438 A * | 8/1962 | Long | C07D 471/04 |
| | | | 106/164.3 |
| 3,157,644 A | 11/1964 | Marschall et al. | |
| 3,222,371 A | 12/1965 | Buell et al. | |
| 3,227,717 A | 1/1966 | Buell et al. | |
| 3,295,917 A | 1/1967 | Cotton | |
| 3,394,143 A | 7/1968 | Wolf | |
| 3,531,414 A | 9/1970 | Randell et al. | |
| 3,791,855 A | 2/1974 | Korpics | |
| 3,793,315 A | 2/1974 | Siegrist | |
| 3,803,049 A * | 4/1974 | Korpics | C23F 11/02 |
| | | | 252/390 |
| 3,804,773 A | 4/1974 | Siegrist | |
| 3,895,170 A * | 7/1975 | Tanaka | C23F 11/149 |
| | | | 428/457 |
| 4,744,950 A | 5/1988 | Hollander | |
| 5,128,065 A | 7/1992 | Hollander | |
| 5,141,675 A | 8/1992 | Vanderpool et al. | |
| 5,156,769 A | 10/1992 | Cha et al. | |
| 5,217,686 A | 6/1993 | Vanderpool et al. | |
| 5,578,556 A | 11/1996 | Farng | |
| 5,746,947 A | 5/1998 | Vanderpool et al. | |
| 5,959,120 A | 9/1999 | Mooberry et al. | |
| 6,475,914 B2 | 11/2002 | Han | |
| 7,442,636 B2 | 10/2008 | Hillman | |
| 8,236,205 B1 * | 8/2012 | Matulewicz | C23F 11/10 |
| | | | 252/390 |
| 8,367,591 B2 * | 2/2013 | Kamano | C10M 141/10 |
| | | | 508/280 |
| 8,535,569 B2 * | 9/2013 | Matulewicz | C23F 11/149 |
| | | | 252/390 |
| 8,921,298 B2 * | 12/2014 | Tyborski | C11D 11/0029 |
| | | | 510/245 |
| 10,190,222 B2 * | 1/2019 | Seetharaman | C23F 11/149 |
| 10,202,694 B2 * | 2/2019 | Rane | C07D 235/12 |
| 2005/0008532 A1 | 1/2005 | Jenkins et al. | |
| 2011/0220514 A1 | 9/2011 | Niazimbetova | |
| 2012/0157386 A1 | 6/2012 | Smith et al. | |
| 2012/0213806 A1 | 8/2012 | Fleury et al. | |
| 2012/0213807 A1 | 8/2012 | Fleury et al. | |
| 2012/0309724 A1 | 12/2012 | Fleury et al. | |
| 2015/0133658 A1 | 5/2015 | Fleury et al. | |
| 2016/0200943 A1 | 7/2016 | Reichardt et al. | |
| 2016/0348251 A1 | 12/2016 | Seetharaman et al. | |

FOREIGN PATENT DOCUMENTS

| | | |
|---|---|---|
| CH | 265418 | 11/1949 |
| CN | 102060793 A | 5/2011 |
| CN | 102153212 A | 8/2011 |
| CN | 103073454 A | 5/2013 |
| CN | 103436888 A | 12/2013 |
| CN | 103467395 A | 12/2013 |
| CN | 104693965 A | 6/2015 |
| CN | 106146420 A | 11/2016 |
| CS | 113919 | 3/1965 |
| DE | 1216177 | 5/1966 |
| DE | 2010764 A | 10/1970 |
| DE | 2148017 A1 | 4/1972 |
| DE | 10143521 A1 | 10/2002 |
| EP | 0009998 A1 | 4/1980 |
| EP | 0096280 A2 | 12/1983 |
| EP | 0135981 A2 | 4/1985 |
| EP | 0225847 A2 | 6/1987 |
| EP | 0237912 A1 | 9/1987 |
| EP | 0331279 A2 | 9/1989 |
| EP | 2933282 A1 | 10/2015 |
| FR | 1358820 A | 4/1964 |
| FR | 1413395 A | 10/1965 |
| GB | 861451 A | 2/1961 |
| GB | 978670 | 12/1964 |
| GB | 1019785 A | 2/1966 |
| GB | 1372522 A | 10/1974 |
| GB | 1518342 A | 7/1978 |
| JP | 31006448 | 7/1956 |
| JP | 39013490 | 7/1964 |
| JP | 46007388 | 2/1971 |
| JP | 48037970 | 11/1973 |
| JP | 1026646 | 1/1989 |
| JP | H 04360880 A | 12/1992 |
| JP | H 0841663 A | 2/1996 |
| JP | 2014058490 A | 4/2014 |
| NL | 6805333 A | 10/1968 |
| SU | 698982 A1 | 11/1979 |
| SU | 1622368 A1 | 1/1991 |
| SU | 1643538 A1 | 4/1991 |
| WO | WO 9411364 A1 | 5/1994 |
| WO | WO 0178723 A1 | 10/2001 |
| WO | WO 2006000544 A2 | 1/2006 |
| WO | WO 2008100607 A2 | 8/2008 |
| WO | WO 2009145591 A2 | 12/2009 |
| WO | WO 2009148290 A2 | 12/2009 |
| WO | WO 2010093011 A1 | 8/2010 |
| WO | WO-2016191667 A2 * | 12/2016 ............ C02F 5/125 |
| WO | WO 2016191667 A2 | 12/2016 |

OTHER PUBLICATIONS

Chadwick, D. et al., "Adsorbed Corrosion Inhibitors Studied by Electron Spectroscopy: Benzotriazole on Copper and Copper Alloys" Corrosion Science (1978) 18: 39-51.

Cotton, J.B. et al., "Benzotriazole and Related Compounds as Corrosion Inhibitors for Copper" Brit. Corr. J. (1967) 2: 1-5.

Finšgar, Matjaž et al., "Inhibition of copper corrosion by 1,2,3-benzotriazole: A review" Corrosion Science (2010) 52: 2737-2749.

Gopi, D. et al., "Corrosion inhibition by benzotriazole derivatives and sodium dodecyl sulphate as corrosion inhibitors for copper in ground water at different temperatures" Surface and Interface Analysis (2015) 47: 618-625.

Gopi, D. et al., "A study on new benzotriazole derivatives as inhibitors on copper corrosion in ground water" Corrosion Science (2009) 51: 2259-2265.

Ling, Y. et al., "Corrosion Inhibition of Copper with Benzotriazole and Other Organic Surfactants" Corrosion Science (1994) 51(5): 367-375.

Mansfield, Florian et al., "Benzotriazole as a Corrosion Inhibitor for Copper II. Acid $N_aCl$ Solutions" Corrosion-Nace (1973) 29(3): 105-107.

Mansfield, Florian et al., "Benzotriazole as a Corrosion Inhibitor for Copper" Corrosion-Nace (1971) 27(7): 289-294.

Walker, R., "Triazole, Benzotriazole and Naphthotriazole as a Corrosion Inhibitor for Copper" Corrosion-Nace (1975) 31(3): 97-100.

Walker, R., "Benzotriazole as a Corrosion Inhibitor for Immersed Copper" Corrosion-Nace (1973) 29(7): 290-298.

Benzo[1,2-d:3,4-d']bistriazole, 2,7-bis(2,4-dinitrophenyl)-2,7-dihydro-4-nitro-, 3,8-dioxide.

Benzo[1,2-d:3,4-d']bistriazole, 3,6-dihydro-3-methyl-, 8-oxide (9Cl).

Benzo[1,2-d:3,4-d']bistriazole, 2,7-bis(2,4-dinitrophenyl)-2,7-dihydro-4-nitro-, 1,6-dioxide, hydrate (1:?).

Benzo[1,2-d:3,4-d']bistriazole, 2,7-bis(2,4-dinitrophenyl)-2,7-dihydro-, 1,6-dioxide.

Benzo[1,2-d:3,4-d']bistriazole, 2,7-bis(2,4-dinitrophenyl)-2,7-dihydro-4-nitro-, 3,8-dioxide, hydrate (1:?).

Benzo[1,2-d:3,4-d']bistriazole, 2,7-bis(2,4-dinitrophenyl)-2,7-dihydro-4-nitro-, 1,6-dioxide.

Benzo[1,2-d:3,4-d']bistriazole, 1,6-dihydro-, 8-oxide (9Cl).

RN 869719-67-5—Benzo[1,2-d:3,4-d']bistriazole, 1,6-dihydro-, 8-oxide (9Cl).

* cited by examiner

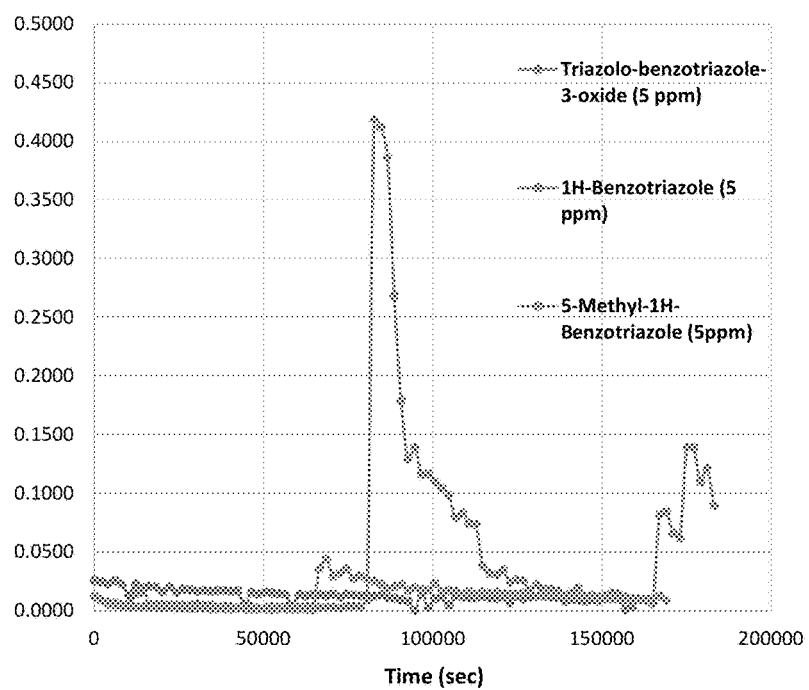

BENZOTRIAZOLE DERIVATIVES AS CORROSION INHIBITORS

TECHNICAL FIELD

The present disclosure generally relates to corrosion inhibitors and methods of inhibiting corrosion. More specifically, the disclosure relates to benzotriazole corrosion inhibitors and methods of inhibiting corrosion of metallic surfaces in aqueous environments.

BACKGROUND

Copper and copper alloy components are commonly used in industrial systems due to the high thermal conductivity and anti-microbial properties of copper. Copper and copper alloys (e.g., bronze and brass) are relatively resistant to corrosion as a result of protective film layers that naturally coat the surface of copper, which include an inner cuprous oxide film layer and an outer cupric oxide film layer. Under anaerobic conditions, these protective layers generally reduce the rate of further corrosion of the metal surface. However, under certain conditions, copper and copper alloys are susceptible to corrosion. In the presence of oxygen and under acidic conditions, oxidation of copper and dissolution of the copper (II) ion into water can occur.

Copper corrosion inhibitors are commonly added to industrial water systems to prevent and reduce dissolution of copper from system surfaces. In particular, the use of nitrogen-containing compounds, such as azoles, is well known for inhibiting the corrosion of copper and copper alloys. It is generally believed that the nitrogen lone pair electrons coordinate to the metal, resulting in the formation of a thin organic film layer that protects the copper surface from elements present in the aqueous system. Nitrogen-containing compounds, such as azoles, are also known to precipitate copper (II) from the aqueous solution, hindering corrosion that can occur due to galvanic reactions between copper and other metals.

Oxidizing halogens are commonly used as biocides in industrial systems to control slime and microbiological growth in water. The protective film provided by many azoles erodes in the presence of oxidizing halogens, such as chlorine, hypochlorite, and hypobromite, thereby reducing the effectiveness of the corrosion inhibitor. Moreover, a decrease in copper (II) precipitation often occurs in the presence of oxidizing halogens due to halogen attack of the corrosion inhibitor in solution. Thus, in the presence of oxidizing halogens, an excess or continuous injection of corrosion inhibitor is often required to maintain the organic protective film.

BRIEF SUMMARY

In some embodiments, a method of inhibiting corrosion of a metal surface in contact with an aqueous system is disclosed. The method comprises adding a corrosion inhibitor composition to the aqueous system, the corrosion inhibitor composition comprising a compound selected from the group consisting of

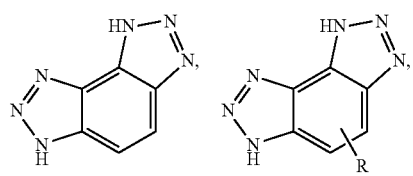

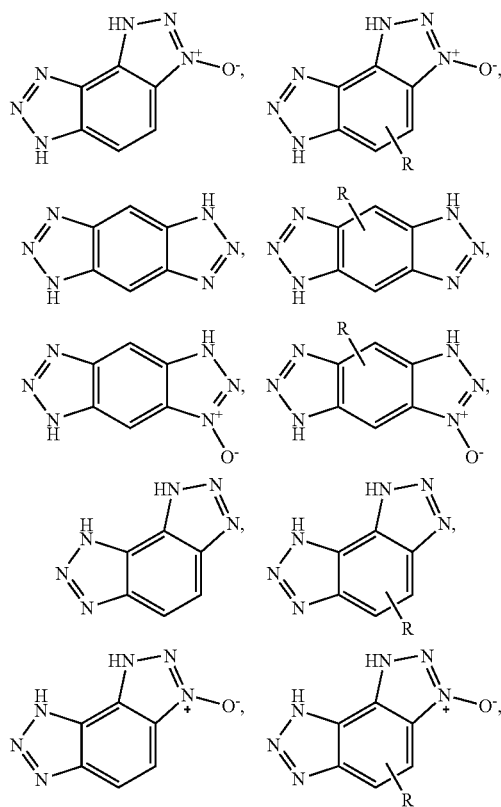

isomer of any of the foregoing compounds, and any combination thereof, wherein R=a linear or branched $C_1$-$C_{10}$ alkyl group.

In some embodiments, the present disclosure provides a corrosion inhibiting formulation. The formulation comprises water, a base, a pH from about 9 to about 14, and a compound selected from the group consisting of

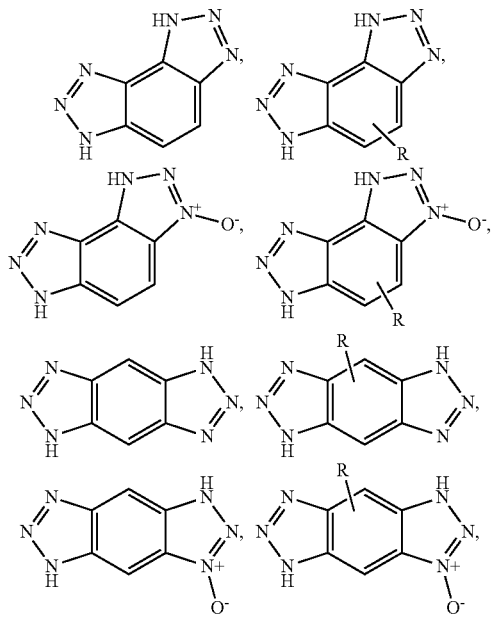

-continued

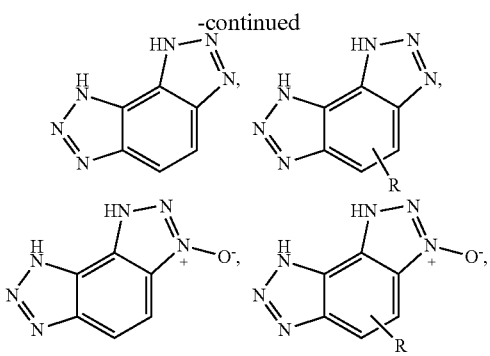

an isomer of any of the foregoing compounds, and any combination thereof, wherein R=a linear or branched $C_1$-$C_{10}$ alkyl group.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which:

FIG. 1 shows a graph depicting performance data for three different corrosion inhibitors.

DETAILED DESCRIPTION

Various embodiments are described below. The relationship and functioning of the various elements of the embodiments may better be understood by reference to the following detailed description. However, embodiments are not limited to those explicitly described herein.

The following definitions are provided to help determine how terms used in this application are to be construed.

"Alkoxy" refers to a moiety of the formula RO—, where R is alkyl, alkenyl, or alkynyl.

"Alkyl" refers to a straight-chain or branched alkyl substituent. Examples of such substituents include, but are not limited to, methyl, ethyl, propyl, isopropyl, n-butyl, sec-butyl, isobutyl, tert-butyl, pentyl, isoamyl, hexyl, and the like.

"Alkylheteroaryl" refers to an alkyl group linked to a heteroaryl group.

"Alkenyl" refers to a straight or branched hydrocarbon having, for example, 2, 3, 4, 5, 6, 7, 8, 9, 10, 11, 12, 13, 14, 15, or 16 carbon atoms, and having one or more carbon-carbon double bonds. Alkenyl groups include, but are not limited to, ethenyl, 1-propenyl, 2-propenyl (allyl), iso-propenyl, 2-methyl-1-propenyl, 1-butenyl, and 2-butenyl. Alkenyl groups may be unsubstituted or substituted by one or more suitable substituents.

"Alkylthio" refers to a moiety of the formula RS—, where R is alkyl, aryl, alkenyl, or alkynyl.

"Alkynyl" refers to a straight or branched hydrocarbon having, for example, 2, 3, 4, 5, 6, 7, 8, 9, 10, 11, 12, 13, 14, 15, or 16 carbon atoms, and having one or more carbon-carbon triple bonds. Alkynyl groups include, but are not limited to, ethynyl, propynyl, and butynyl. Alkynyl groups may be unsubstituted or substituted by one or more suitable substituents.

"Aminoalkyl" refers to a nitrogen substituent attached to one or more carbon groups, such as alkyl or aryl.

"Aqueous system" refers to any system containing one or more metallic surfaces/components, which are in contact with water on a periodic or continuous basis.

"Aryl" refers to an unsubstituted or substituted aromatic carbocyclic substituent, as commonly understood in the art, and the term "$C_6$-$C_{10}$ aryl" includes phenyl and naphthyl. It is understood that the term "aryl" applies to cyclic substituents that are planar and comprise 4n+2n electrons, according to Hückel's Rule.

"Carbonyl" refers to a substituent comprising a carbon double bonded to an oxygen. Nonlimiting examples of such substituents include aldehydes, ketones, carboxylic acids, esters, amides, and carbamates.

"Cycloalkyl" refers to a cyclic alkyl substituent containing from, for example, about 3 to about 8 carbon atoms, about 4 to about 7 carbon atoms, or from about 4 to about 6 carbon atoms. Examples of such substituents include cyclopropyl, cyclobutyl, cyclopentyl, cyclohexyl, cycloheptyl, cyclooctyl, and the like. The cyclic alkyl groups may be unsubstituted or further substituted with alkyl groups, such as methyl groups, ethyl groups, and the like.

"Halogen" or "halo" refers to F, Cl, Br, and I.

"Halosubstituted alkyl" refers to an alkyl group as described above substituted with one or more halogens, such as chloromethyl, trifluoromethyl, 2,2,2-trichloroethyl, and the like.

"Heteroaryl" refers to a monocyclic or bicyclic 5- or 6-membered ring system, wherein the heteroaryl group is unsaturated and satisfies Hückel's rule. Non-limiting examples of heteroaryl groups include furanyl, thiophenyl, pyrrolyl, pyrazolyl, imidazolyl, 1,2,3-triazolyl, 1,2,4-triazolyl, isoxazolyl, oxazolyl, isothiazolyl, thiazolyl, 1,3,4-oxadiazol-2-yl, 1,2,4-oxadiazol-2-yl, 5-methyl-1,3,4-oxadiazole, 3-methyl-1,2,4-oxadiazole, pyridinyl, pyrimidinyl, pyrazinyl, triazinyl, benzofuranyl, benzothiophenyl, indolyl, quinolinyl, isoquinolinyl, benzimidazolyl, benzoxazolinyl, benzothiazolinyl, quinazolinyl, and the like.

"Industrial water system" means any system that circulates water as a component. Non-limiting examples of "industrial water systems" include cooling systems, boiler systems, heating systems, membrane systems, paper making systems, food and beverage systems, oil and gas systems, and any other system that circulates or includes water.

"Isomer" refers to a molecule that has the same molecular formula as another molecule but has a different chemical structure than the other molecule. An isomer of a molecule has the same number of atoms of each element of the molecule but has a different arrangement of its atoms.

"Mild steel" refers to carbon and low alloy steels.

"Oxidizing halogen" refers to an oxidizing agent comprising at least one halogen. Examples of oxidizing halogens include, but are not limited to, chlorine bleach, chlorine, bromine, iodine, hypochlorite, hypobromite, iodine/hypoiodous acid, hypobromous acid, halogenated hydantoins, chlorine dioxide, stabilized versions of hypochlorous or hypobromous acids, and compounds or chemical groups capable of releasing chlorine, bromine, or iodine.

"Water" means any substance that has water as a component or a primary component. Water may include pure water, tap water, fresh water, recycled water, brine, steam, and/or any aqueous solution or aqueous blend.

The present disclosure relates to corrosion inhibitor compositions, methods of inhibiting corrosion, and formulations useful for inhibiting corrosion. Inhibiting corrosion includes, for example, reducing corrosion, completely eliminating corrosion or prohibiting corrosion from occurring for some period of time, lowering a rate of corrosion, etc. In some embodiments, the corrosion inhibitor compositions are useful for inhibiting corrosion of metallic surfaces in aqueous environments. In some embodiments, the corrosion inhibitor compositions and/or formulations comprise one or more benzotriazoles.

For example, in some embodiments, a corrosion inhibitor composition or formulation may comprise 1H,6H-Triazolo[4,5-e]-benzotriazole-3-oxide, and/or any analogue, isomer, and/or derivative thereof. As will be described and exemplified below, the benzotriazoles disclosed herein display superior performance as corrosion inhibitors and the inhibition efficiency was found to increase with an increase in the concentration of these corrosion inhibitors. The presently disclosed benzotriazoles also have a high tolerance to calcium hardness and bleach. For example, in some embodiments, the corrosion inhibitor compositions and formulations disclosed herein achieve a corrosion rate of less than 0.2 mpy in the presence and in the absence of bleach.

The presently disclosed corrosion inhibitor compositions may comprise one of the following compounds or any combination of any of the following compounds:

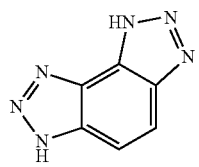 [SMILES: c1cc2[nH]nnc2c2[nH]nnc12]

(1H,6H-Triazolo[4,5-e]-benzotriazole) and any isomer thereof,

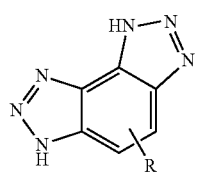

and any isomer thereof, wherein R=a linear alkyl group or a branched alkyl group. In some embodiments, the alkyl group comprises from 1 to about 10 carbon atoms, such as $C_1$-$C_{10}$, $C_1$-$C_5$, $C_5$-$C_{10}$.

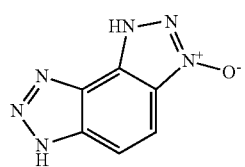

(1H,6H-Triazolo[4,5-e]-benzotriazole-3-oxide) and any isomer thereof,

and any isomer thereof, wherein R=a linear alkyl group or a branched alkyl group. In some embodiments, the alkyl group comprises from 1 to about 10 carbon atoms, such as $C_1$-$C_{10}$, $C_1$-$C_5$, $C_5$-$C_{10}$.

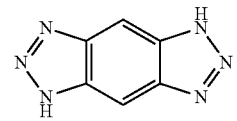 [SMILES: c1c2nn[nH]c2cc2nn[nH]c12]

(1,5-dihydrobenzo[1,2-d:4,5-d']bis([1,2,3]triazole) and any isomer thereof,

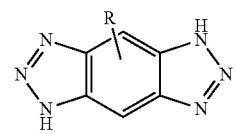

and any isomer thereof, wherein R=a linear alkyl group or a branched alkyl group. In some embodiments, the alkyl group comprises from 1 to about 10 carbon atoms, such as $C_1$-$C_{10}$, $C_1$-$C_5$, $C_5$-$C_{10}$.

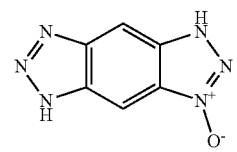 [SMILES: [O-][n+]1n[nH]c2cc3nn[nH]c3cc21]

and any isomer thereof,

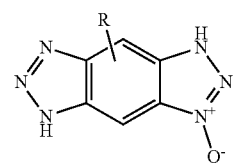

and any isomer thereof, wherein R=a linear alkyl group or a branched alkyl group. In some embodiments, the alkyl group comprises from 1 to about 10 carbon atoms, such as $C_1$-$C_{10}$, $C_1$-$C_5$, $C_5$-$C_{10}$.

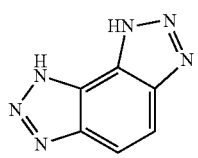 [SMILES: c1cc2nn[nH]c2c2[nH]nnc12]

(1,8-dihydrobenzo[1,2-d:3,4-d']bis([1,2,3]triazole) and any isomer thereof,

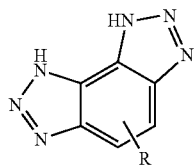

and any isomer thereof, wherein R=a linear alkyl group or a branched alkyl group. In some embodiments, the alkyl group comprises from 1 to about 10 carbon atoms, such as $C_1$-$C_{10}$, $C_1$-$C_5$, $C_5$-$C_{10}$.

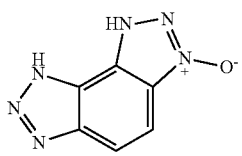

and any isomer thereof, and

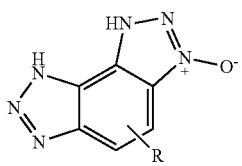

and any isomer thereof, wherein R=a linear alkyl group or a branched alkyl group. In some embodiments, the alkyl group comprises from 1 to about 10 carbon atoms, such as $C_1$-$C_{10}$, $C_1$-$C_5$, $C_5$-$C_{10}$.

The corrosion inhibitor compositions/formulations disclosed herein may provide corrosion protection for any metal including, but not limited to, iron, copper, iron alloys, copper alloys, admiralty brass, copper nickel (90/10, 80/20 and 70/30), aluminium brass, manganese brass, leaded naval bronze, and phosphor bronze.

The presently disclosed corrosion inhibitor compositions/formulations may also be used to protect silver, steel (e.g., galvanized steel) and/or aluminum, for example.

In certain embodiments, a corrosion inhibitor composition and/or formulation as disclosed herein may be added to an aqueous system in contact with a metal surface comprising, for example, copper, to inhibit corrosion of the metal. In certain embodiments, a corrosion inhibitor composition and/or formulation as disclosed herein may be added to an aqueous system in contact with a metal surface comprising, for example, a copper alloy, to inhibit metal corrosion.

A corrosion inhibitor composition and/or formulation as disclosed herein can be used to protect any copper alloy, including bronze and brass. Bronze commonly comprises copper and tin, but may comprise other elements including aluminum, manganese, silicon, arsenic, and phosphorus. Brass comprises copper and zinc, and is commonly used in piping in water boiler systems. In certain embodiments, a corrosion inhibitor composition and/or formulation as disclosed herein is added to an aqueous system in contact with a metal surface comprising bronze to inhibit metal corrosion. In certain embodiments, a corrosion inhibitor composition and/or formulation as disclosed herein is added to an aqueous system in contact with a metal surface comprising brass to inhibit metal corrosion. In certain embodiments, a corrosion inhibitor composition and/or formulation as disclosed herein is added to an aqueous system in contact with a metal surface comprising a copper-nickel alloy to inhibit metal corrosion.

In certain embodiments, a corrosion inhibitor composition and/or formulation as disclosed herein inhibits the corrosion of mild steel. In certain embodiments, a corrosion inhibitor composition and/or formulation as disclosed herein inhibits the corrosion of metal alloys including, but not limited to, galvanized steel, stainless steel, cast iron, nickel, and combinations thereof.

In certain embodiments, a corrosion inhibitor composition and/or formulation as disclosed herein inhibits pitting corrosion of a metallic surface, such as a surface comprising mild steel.

The metal corrosion rate provided by a corrosion inhibitor composition and/or formulation as disclosed herein is not limited. In certain embodiments, a corrosion inhibitor composition and/or formulation as disclosed herein provides a metal corrosion rate that is acceptable according to industry standards, e.g., about 0.2 mpy or less. In certain embodiments, a corrosion inhibitor composition and/or formulation as disclosed herein provides a metal corrosion rate of about 0.1 mpy or less. In additional embodiments, a corrosion inhibitor composition and/or formulation as disclosed herein provides a metal corrosion rate of about 0.1 mpy or less, about 0.05 mpy or less, about 0.04 mpy or less, about 0.03 mpy or less, about 0.02 mpy or less, about 0.01 mpy or less, about 0.005 mpy or less, or about 0.002 mpy or less.

While a corrosion inhibitor composition and/or formulation as disclosed herein can be added to an aqueous system at any dosage rate, it is generally added to an aqueous system at a dosage rate of from about 0.01 ppm to about 500 ppm. In certain embodiments, a corrosion inhibitor composition and/or formulation as disclosed herein is added to an aqueous system at a dosage rate of from about 0.01 ppm to about 100 ppm, from about 0.01 ppm to about 75 ppm, from about 0.01 ppm to about 50 ppm, from about 0.01 ppm to about 25 ppm, from about 0.01 ppm to about 10 ppm, from about 0.01 ppm to about 5 ppm, from about 0.1 ppm to about 100 ppm, from about 0.1 ppm to about 75 ppm, from about 0.1 ppm to about 50 ppm, from about 0.1 ppm to about 25 ppm, from about 0.1 ppm to about 10 ppm, from about 0.1 ppm to about 5 ppm, from about 1 ppm to about 100 ppm, from about 1 ppm to about 75 ppm, from about 1 ppm to about 50 ppm, from about 1 ppm to about 25 ppm, from about 1 ppm to about 10 ppm, from about 5 ppm to about 100 ppm, from about 10 ppm to about 100 ppm, from about 25 ppm to about 100 ppm, from about 50 ppm to about 100 ppm, or from about 80 ppm to about 100 ppm.

The corrosion inhibitor compositions and/or formulations as disclosed herein can be used to inhibit corrosion of metal in an aqueous system having any pH. In certain embodiments, a corrosion inhibitor composition and/or formulation as disclosed herein is added to an aqueous system having a pH of from about 6 to about 12, from about 6 to about 11, from about 6 to about 10, from about 6 to about 9, from about 6 to about 8, from about 7 to about 12, from about 8 to about 12, from about 9 to about 12, from about 7 to about 10, or from about 8 to about 10.

An advantage of the corrosion inhibitor compositions and/or formulations as disclosed herein is that they generally provide corrosion protection for metal surfaces in the presence of oxidizing halogen compounds. In certain embodiments, a corrosion inhibitor composition and/or formulation as disclosed herein inhibits metal corrosion in the presence of oxidizing halogen compounds including, but not limited to, hypochlorite bleach, chlorine, bromine, hypochlorite, hypobromite, chlorine dioxide, iodine/hypoiodous acid, hypobromous acid, halogenated hydantoins, stabilized versions of hypochlorous or hypobromous acids, or combinations thereof.

The metal corrosion rate provided by the corrosion inhibitor compositions and/or formulations in the presence of an oxidizing compound is not limited. In certain embodiments, a corrosion inhibitor composition and/or formulation as disclosed herein provides a metal corrosion rate in the presence of an oxidizing halogen compound of about 0.2 mpy or less. In certain embodiments, a corrosion inhibitor composition and/or formulation as disclosed herein provides a metal corrosion rate in the presence of an oxidizing halogen compound of about 0.1 mpy or less, such as about 0.05 mpy or less, about 0.04 mpy or less, about 0.03 mpy or less, about 0.02 mpy or less, about 0.01 mpy or less, about 0.005 mpy or less, or about 0.002 mpy or less. In certain embodiments, the metal corrosion rate provided by a corrosion inhibitor composition and/or formulation as disclosed herein is essentially the same in the absence or presence of an oxidizing halogen compound.

In certain embodiments, a corrosion inhibitor composition and/or formulation as disclosed herein inhibits metal corrosion when added to an aqueous system comprising a non-halogen-containing oxidizing biocide including, but not limited to, peroxides (e.g., hydrogen peroxide), persulfates, permanganates, and peracetic acids.

Another advantage of using the corrosion inhibitor compositions and/or formulations as disclosed herein is a smaller amount of oxidizing halogen compound is required to maintain low microbial levels because the corrosion inhibitor compositions and/or formulations as disclosed herein generally have reduced interactions with the oxidizing halogen compound. Furthermore, halogenated azoles that result from the reaction between an azole and oxidizing agent are known to be environmentally undesirable due to their toxicity. Thus, another advantage of the present disclosure is that the corrosion inhibitor compositions and/or formulations as disclosed herein are resistant (or essentially resistant) to halogen attack, and do not lead to the release of halogenated azoles into the environment.

In certain embodiments, the aqueous system is a cooling water system. The cooling water system can be a closed loop cooling water system or an open loop cooling water system. In certain embodiments, a corrosion inhibitor composition and/or formulation as disclosed herein is added to a closed loop cooling water system at a dosage rate of from about 0.01 ppm to about 200 ppm. In certain embodiments, a corrosion inhibitor composition and/or formulation as disclosed herein is added to an open loop cooling water system at a dosage rate of from about 0.01 ppm to about 20 ppm.

The corrosion inhibitor compositions and/or formulations as disclosed herein are contacted with a metal surface by any suitable method. In certain embodiments, a corrosion inhibitor composition (or solution comprising the composition) and/or formulation as disclosed herein is contacted with a metal surface by immersion, spraying, or other coating techniques. In certain embodiments, a corrosion inhibitor composition and/or formulation is introduced into the water of the aqueous system by any conventional method, such as manually or automatically using a chemical injection pump, and is fed into the aqueous system on either a periodic or continuous basis.

In certain embodiments, if a corrosion inhibitor composition and/or formulation as disclosed herein is relatively insoluble in water, the composition may be made soluble by forming an organic or inorganic salt of one or more of the compounds within the composition/formulation. Thus, in certain embodiments, a corrosion inhibitor composition and/or formulation as disclosed herein comprises a water-soluble salt of one or more of the compounds disclosed herein. In certain embodiments, a corrosion inhibitor composition and/or formulation as disclosed herein is added as a solution in a water-miscible co-solvent including, but not limited to, acetone, methanol, ethanol, propanol, formic acid, formamide, propylene glycol, or ethylene glycol. In certain embodiments, a co-solvent is used to achieve maximum solubility of a corrosion inhibitor composition and/or formulation as disclosed herein in the aqueous system. In certain embodiments, low molecular weight polyethylene glycol, polypropylene glycol, a surfactant (e.g., organic sulfonic acid), or combinations thereof are used to increase the solubility of a corrosion inhibitor composition and/or formulation as disclosed herein.

Those skilled in the art will appreciate that the corrosion inhibitor compositions and/or formulations disclosed herein can be added to an aqueous system alone or in combination with other corrosion inhibitors or treatment chemicals. Multiple corrosion inhibitors can be dosed as a combined corrosion inhibitor formulation or each corrosion inhibitor can be added separately, including two or more corrosion inhibitor compositions as disclosed herein. Moreover, the corrosion inhibitor compositions and/or formulations disclosed herein can be added to an aqueous system in combination with a variety of additional corrosion inhibitors including, but not limited to, azoles, orthophosphate, polyphosphates, phosphonates, molybdates, silicates, oximes, and nitrites.

The corrosion inhibitor compositions and/or formulations disclosed herein also can be added to an aqueous system in combination with a variety of additional additives, such as treatment polymers, anti-microbial agents, anti-scaling agents, colorants, fillers, buffers, surfactants, viscosity modifiers, chelating agents, dispersants, deodorants, masking agents, oxygen scavengers, and indicator dyes.

The corrosion inhibitor compositions and/or formulations as disclosed herein may be added to an aqueous system in any form. In certain embodiments, a corrosion inhibitor composition and/or formulation is added to an aqueous system as a dried solid. In certain embodiments, a corrosion inhibitor composition and/or formulation is added to an aqueous system as a solution in a co-solvent miscible with water. In certain embodiments, a corrosion inhibitor composition and/or formulation as disclosed herein is added to an aqueous system as an aqueous solution.

In certain embodiments, a corrosion inhibitor composition and/or formulation as disclosed herein is added to a laundry system, a warewashing system, an aqueous system that recirculates water, and/or an aqueous system that has stagnant water.

The corrosion inhibitor compositions, formulations, and methods of inhibiting corrosion disclosed herein can be applied to open loop or closed loop recirculating water systems, such as cooling water systems. Certain embodiments of the presently disclosed corrosion inhibitor compositions and/or formulations achieve corrosion rates of 0.2 mpy or less, and these low rates can be achieved in the presence or absence of bleach. In some embodiments, the temperature of the water in the aqueous system may be up to about 60° C., such as from about 10° C. to about 60° C. In certain embodiments, the presently disclosed corrosion inhibitor compositions and/or formulations have a chloride tolerance up to about 1000 ppm as Cl. Additionally, in certain embodiments, the presently disclosed corrosion inhibitor compositions and/or formulations are stable for a holding time index (HTI) of about 150 hours. HTI is the turnover rate of water and constituents. In a cooling tower circuit, HTI is understood as the amount of time required to dilute added chemical to 50% of its original concentration.

The present disclosure contemplates various formulations that may be used to inhibit corrosion of metallic surfaces in aqueous systems. For example, a corrosion inhibiting formulation may comprise water and a compound selected from the group consisting of

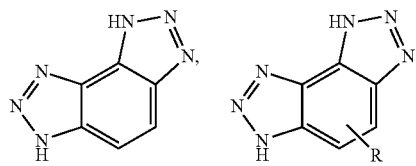

wherein R=a linear or branched $C_1$-$C_{10}$ alkyl group,

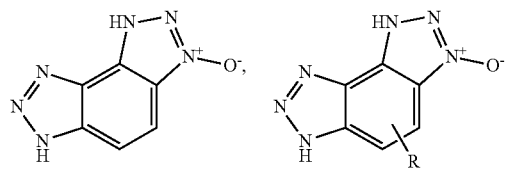

wherein R=a linear or branched $C_1$-$C_{10}$ alkyl group,

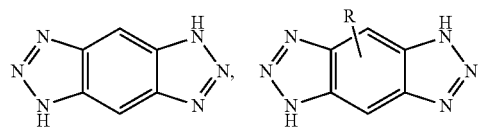

wherein R=a linear or branched $C_1$-$C_{10}$ alkyl group,

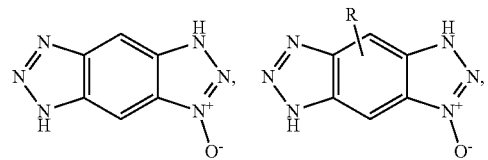

wherein R=a linear or branched $C_1$-$C_{10}$ alkyl group,

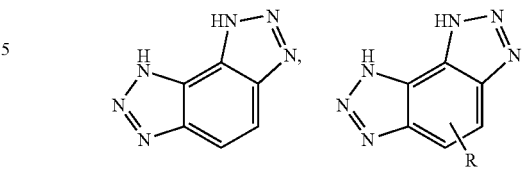

wherein R=a linear or branched $C_1$-$C_{10}$ alkyl group,

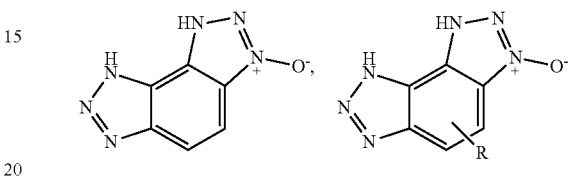

wherein R=a linear or branched $C_1$-$C_{10}$ alkyl group, an isomer of any of the foregoing compounds, and any combination thereof.

Certain embodiments of the formulation also comprise a base, such as sodium hydroxide. In some embodiments, sodium hydroxide may be added to the formulation as a 50% aqueous solution. In some embodiments, sodium hydroxide is added until the formulation has a pH of about 9 to about 14, such as from about 9 to about 10.

The formulation may comprise various amounts of each component. For example, the formulation may comprise about 70% by weight water and about 30% by weight of one or more corrosion inhibitor compounds. The formulations may also comprise a base, such as sodium hydroxide, in whatever amount is necessary to achieve the desired pH. In some embodiments, the formulation may comprise from about 1% to about 10% base, from about 80% to about 60% water, and from about 40% to about 20% of one or more corrosion inhibitor compounds. In certain embodiments, the formulation comprises about 1% base, about 69% water, and about 30% of one or more corrosion inhibitor compounds. In some embodiments, a 20 gram formulation comprises about 6 g bis-benzotriazole, about 13.8 g water, and about 0.2 g NaOH (50% solution).

In some embodiments, a formulation is obtained by dissolving a corrosion inhibitor compound, such as bis-benzotriazole and/or an oxide of bis-benzotriazole, in water. The pH of the water may be from about 9 to about 14, such as form about 9 to about 10. pH adjustment may help make the corrosion inhibitor compound soluble in water. pH adjustment can be accomplished using a base, such as diluted NaOH (about 50% in water). The formulation may comprise one or more corrosion inhibitor compounds.

EXAMPLES

The following examples further illustrate certain embodiments of the present disclosure but should not be construed in any way as limiting the scope of the present disclosure.

Various electrochemical experiments were carried out. The pH of the test water was maintained at about 7 in each experiment using carbon dioxide. The water temperature was maintained at about 45° C. throughout the experiment. Copper coupon samples were immersed in 1 liter electrochemical cells comprising a corrosion inhibitor (about 5 ppm active) and the Rp (polarization resistance) was recorded over a 48-hour period. From about 24 hours to about 48 hours, a few microliters of bleach was added to obtain a FRC (free residual chlorine) level of about 0.5 to about 1.2 ppm. The analysis was conducted using the following testing conditions: initial E: about −0.02V; final E: about +0.02V; scan rate: about 0.5 mV/s; sample period: about 1 second; repeat time: about 15 minutes; sample area: about 5 cm$^2$; density: about 8.89 g/cm$^3$.

The results of the experiment are depicted in FIG. 1. As can be seen, three different corrosion inhibitors were tested including bis-benzotriazole (triazolo-benzotriazole-3-oxide), 1H-benzotriazole (BZT), and 5-methyl-1H-benzotriazole (TT). The x-axis depicts the corrosion rate (mpy). Bleach was added after about 70,000 seconds and the FRC was maintained from about 0.5 to about 1.2 ppm. In comparison to TT and BZT, the corrosion rate of bis-benzotriazole was very low in the presence of biocide as well as in the absence of biocide.

Any composition/formulation disclosed herein may comprise, consist of, or consist essentially of any of the compounds/components disclosed herein. In accordance with the present disclosure, the phrases "consist essentially of," "consists essentially of," "consisting essentially of," and the like limit the scope of a claim to the specified materials or steps and those materials or steps that do not materially affect the basic and novel characteristic(s) of the claimed invention.

As used herein, the term "about" refers to the cited value being within the errors arising from the standard deviation found in their respective testing measurements, and if those errors cannot be determined, then "about" refers to within 10% of the cited value.

All of the compositions, formulations, and methods disclosed and claimed herein can be made and executed without undue experimentation in light of the present disclosure. While this invention may be embodied in many different forms, there are described in detail herein specific embodiments of the invention. The present disclosure is an exemplification of the principles of the invention and is not intended to limit the invention to the particular embodiments illustrated.

In addition, unless expressly stated to the contrary, use of the term "a" is intended to include "at least one" or "one or more." For example, "a corrosion inhibitor compound" is intended to include "at least one corrosion inhibitor compound" or "one or more corrosion inhibitor compounds."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of inhibiting corrosion of a metal surface in contact with an aqueous system, comprising:
adding a corrosion inhibitor composition to the aqueous system, the corrosion inhibitor composition comprising a compound selected from the group consisting of

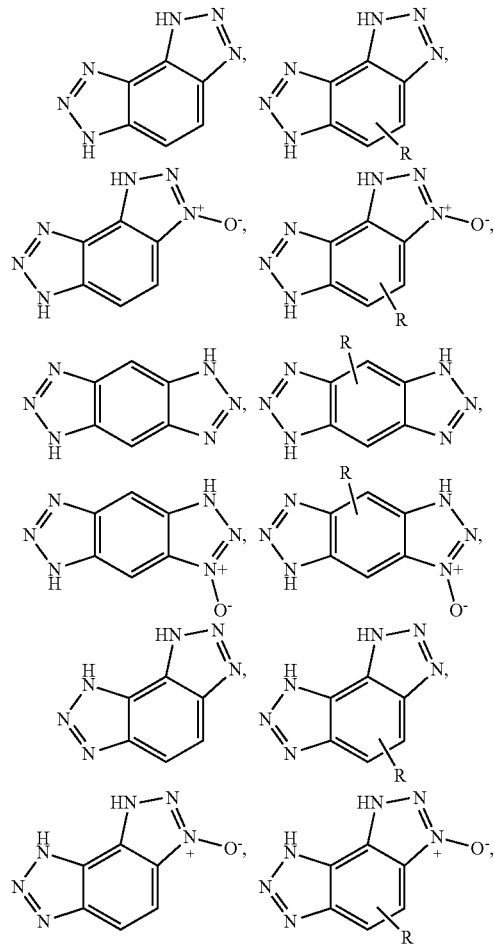

an isomer of any of the foregoing compounds, and any combination thereof, wherein R=a linear or branched $C_1$-$C_{10}$ alkyl group.

2. The method of claim 1, wherein the metal surface comprises iron, copper, an iron alloy, a copper alloy, admiralty brass, about 90% copper and about 10% nickel, about 80% copper and about 20% nickel, about 70% copper and about 30% nickel, aluminium brass, manganese brass, leaded naval bronze, phosphor bronze, and any combination thereof.

3. The method of claim 1, wherein the metal surface comprises copper.

4. The method of claim 1, wherein the corrosion inhibitor composition comprises 1H,6H-Triazolo[4,5-e]-benzotriazole-3-oxide, 1H,6H-Triazolo[4,5-e]-benzotriazole, and any combination thereof.

5. The method of claim 1, wherein the corrosion inhibitor composition comprises 1,5-dihydrobenzo[1,2-d:4,5-d']bis([1,2,3]triazole, an oxide thereof, and any combination thereof.

6. The method of claim 1, wherein the corrosion inhibitor composition comprises 1,8-dihydrobenzo[1,2-d:3,4-d']bis([1,2,3]triazole, an oxide thereof, and any combination thereof.

7. The method of claim 1, wherein the corrosion inhibitor composition is added to the aqueous system at a dosage rate of from about 0.01 ppm to about 500 ppm.

8. The method of claim 1, wherein the aqueous system comprises an oxidizing halogen compound.

9. The method of claim 8, wherein the oxidizing halogen compound is selected from the group consisting of hypochlorite bleach, chlorine, bromine, hypochlorite, hypobromite, chlorine dioxide, iodine/hypoiodous acid, hypobromous acid, a halogenated hydantoin, and any combination thereof.

10. The method of claim 1, wherein the aqueous system comprises a non-halogen-containing oxidizing biocide.

11. The method of claim 10, wherein the non-halogen-containing oxidizing biocide is selected from the group consisting of a peroxide, a persulfate, a permanganate, a peracetic acid, and any combination thereof.

12. The method of claim 1, wherein the corrosion inhibitor composition comprises a water-miscible co-solvent.

13. The method of claim 12, wherein the water-miscible co-solvent is selected from the group consisting of acetone, methanol, ethanol, propanol, formic acid, formamide, propylene glycol, ethylene glycol, and any combination thereof.

14. The method of claim 1, wherein the corrosion inhibitor composition comprises an additive.

15. The method of claim 14, wherein the additive is selected from the group consisting of an additional corrosion inhibitor, a treatment polymer, an anti-microbial agent, an anti-scaling agent, a colorant, a filler, a buffer, a surfactant, a viscosity modifier, a chelating agent, a dispersant, a deodorant, a masking agent, an oxygen scavenger, an indicator dye, and any combination thereof.

16. The method of claim 1, wherein the aqueous system is a cooling system, a boiler system, a heating system, a membrane system, a paper making system, a food and beverage system, an oil and gas system, or any system that comprises water.

17. The method of claim 1, wherein the corrosion inhibitor comprises bis-benzotriazole and/or an oxide of bis-benzotriazole.

18. A corrosion inhibiting formulation, comprising:
water;
a base;
a pH from about 9 to about 14; and
a compound selected from the group consisting of

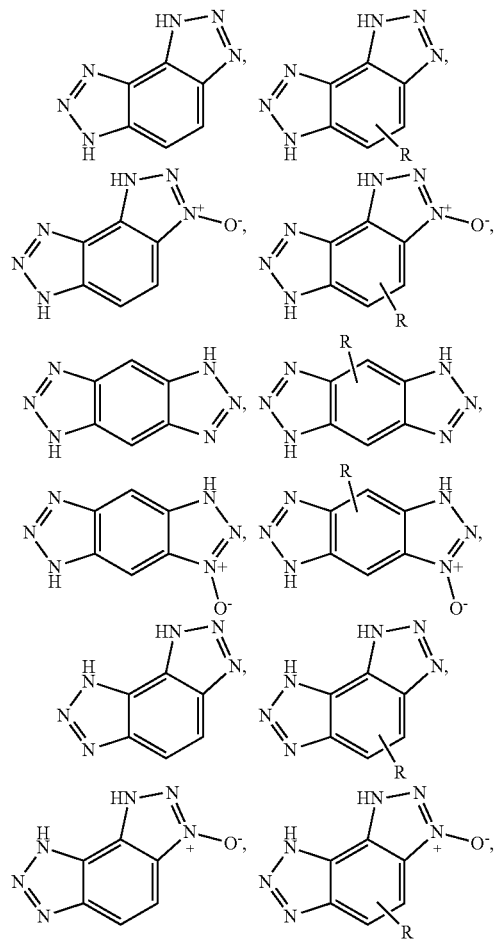

an isomer of any of the foregoing compounds, and any combination thereof, wherein R=a linear or branched $C_1$-$C_{10}$ alkyl group.

19. The formulation of claim 18, wherein the base comprises sodium hydroxide.

20. The formulation of claim 18, wherein the formulation comprises about 70% by weight water and about 30% by weight of the compound.

* * * * *

UNITED STATES PATENT AND TRADEMARK OFFICE
CERTIFICATE OF CORRECTION

PATENT NO. : 10,858,585 B2  Page 1 of 1
APPLICATION NO. : 16/235299
DATED : December 8, 2020
INVENTOR(S) : Anand Harbindu et al.

It is certified that error appears in the above-identified patent and that said Letters Patent is hereby corrected as shown below:

On the Title Page

Item (74) (ATTORNEY, AGENT, OR FIRM), Line 2, delete "Thomburg" and insert -- Thornburg --.

Signed and Sealed this
Ninth Day of March, 2021

Drew Hirshfeld
*Performing the Functions and Duties of the
Under Secretary of Commerce for Intellectual Property and
Director of the United States Patent and Trademark Office*